350-377 SR
XR 3,155,944
CROSS REFERENCE SEARCH ROOM

Nov. 3, 1964 P. E. OBERG ETAL 3,155,944

PHOTO-MAGNETIC MEMORY DEVICES

Filed Aug. 20, 1959

INVENTORS
PAUL E. OBERG
ROBERT W. OLMEN
BY Cushman, Darby & Cushman
ATTORNEYS

3155944
OR IN 365/122

United States Patent Office 3,155,944
Patented Nov. 3, 1964

3,155,944
PHOTO-MAGNETIC MEMORY DEVICES

Paul E. Oberg, Bloomington, and Robert W. Olmen, White Bear Lake, Minn., assignors to Sperry Rand Corporation, New York, N.Y., a corporation of Delaware

Filed Aug. 20, 1959, Ser. No. 835,066
15 Claims. (Cl. 340—174)

This invention relates generally to apparatus for reading the information stored in the memory portion of a computer, such as is used in digital processing equipment, and more specifically to a system employing magneto-optical techniques to non-destructively detect the remanent magnetic state of these memory elements.

Prior art readout methods of detecting the magnetic state of a core of the thin film type, such as is produced according to the S. M. Rubens U.S. Patent 2,900,282, entitled "Method of Treating Magnetic Material and Resulting Articles," have necessitated the use of a suitably oriented sense winding to detect a change of flux induced therein when the film core is switched or disturbed.

The present invention utilizes the discovery made in 1888 by John Kerr, that when plane-polarized light, i.e., all the light waves are vibrating parallel to a plane through the axis of the beam, in which the electrical vector E is either parallel with or perpendicular to the plane of incidence, is reflected at other than normal incidence from a thin film of magnetic material having its magnetization vector in the plane of the film, but at some angle other than normal to the plane of incidence, the plane of polarization of the incident light is rotated. If the reflected light is examined with a light polarizing analyzer such as a Nicol prism, it will be found that the reflected light cannot be completely extinguished. The reflected light is, therefore, said to be elliptically polarized due to the presence of the magnetic field. In order to completely extinguish the reflected light, a one-quarter wave plate must be used to remove the component of the wave which is perpendicular to the plane of the incident light, commonly called the "Kerr Component."

Further experiments conducted by C. A. Fowler, Jr. and N. Fryer, as reported in an article entitled "Magnetic Domains by the Longitudinal Kerr Effect," appearing in vol. 94 of The Physical Review on page 52, show that, when the Kerr principle is applied to a large single crystal of silicon iron having an easy direction of magnetization parallel to the plane of incidence of the light, by magnetizing the crystal to saturation first in one direction and then in the reverse direction the intensity of light passing through the analyzer, and reaching a photo-cell used to provide an electrical indication of this intensity, can be made to differ by as much as 20%.

In another article, by the same authors, entitled "Magnetic Domains in Thin Films by the Faraday Effect," appearing in vol. 104 of The Physical Review, page 552, the authors point out that the Kerr magneto-optical techniques, which proved well suited for photographing magnetic domains in vacuum-deposited thin films fo ferromagnetic material, begins to lose effectiveness for films thin enough to be transparent, principally, because of the decreased intensity of the reflected light. Since the loss of reflected intensity is accompanied by an increase in the transmitted light, the Faraday effect (the magnetic rotation of the polarization plane in a transmitted beam when passing through a magnetic field), instead of the Kerr effect, is utilized for photographing the magnetic domains.

In the digital data computer art, information is stored on thin magnetic films of the type having a preferred axis of magnetization and two stable magnetization states. The information is stored by magnetizing such a film into one or the other of its stable magnetization states. In order to determine the information stored thereon, it is, therefore, necessary to determine the remanent magnetic state of the film. By applying the Kerr and Faraday effects to the magnetic memory films, a system for non-destructively sensing the remanent state of magnetization thereof is obtained.

It is, therefore, an object of the present invention to provide an optical system for non-destructively sensing the remanent state of a magnetic film element.

Another object of this invention is to provide a system which uses the magnetic rotation of polarized light when reflected from or transmitted through a magnetic element as an indication of the remanent state of that magnetic film element.

Still another object of this invention is to provide a magneto-optical device capable of performing logical functions.

Other objects and advantages of this invention will become obvious to those having ordinary skill in the art by reference to the following detailed description of exemplary embodiments of the apparatus and the appended claims. The various features of the exemplary embodiments may best be understood with reference to the following drawings wherein:

Analyzers and polarizers are used throughout the various embodiments of this invention. These elements are made of a suitable polarizing material such as a Nicol prism or other readily available polarizing material such as is produced by the Polariod Corporation of Cambridge, Massachusetts.

The magnetic films employed in the various embodiments have been produced according to the aforementioned Rubens application. However, it is understood that this invention is not limited thereto and is applicable to magnetic materials made by any suitable process. Wherever the Kerr effect is used to determine the remanent state of a thin magnetic film element or said in performing a logical function, the thin magnetic film element is of sufficient thickness to reflect the greater portion of the light waves incident thereto. Wherever the Faraday effect is used, the magnetic film element is deposited on a transparent substrate and is of sufficient thinness to transmit a sufficient portion of the light waves incident thereto. Further, in all of the embodiments, the plane polarized light is incident to the thin magnetic film elements at an angle other than normal thereto, and the plane of incidence thereof is at an angle other than 90° with either of the stable states of the magnetic film.

Figures 1, 2, 3, 4, 5, 6, 7, 8, 9, 10:
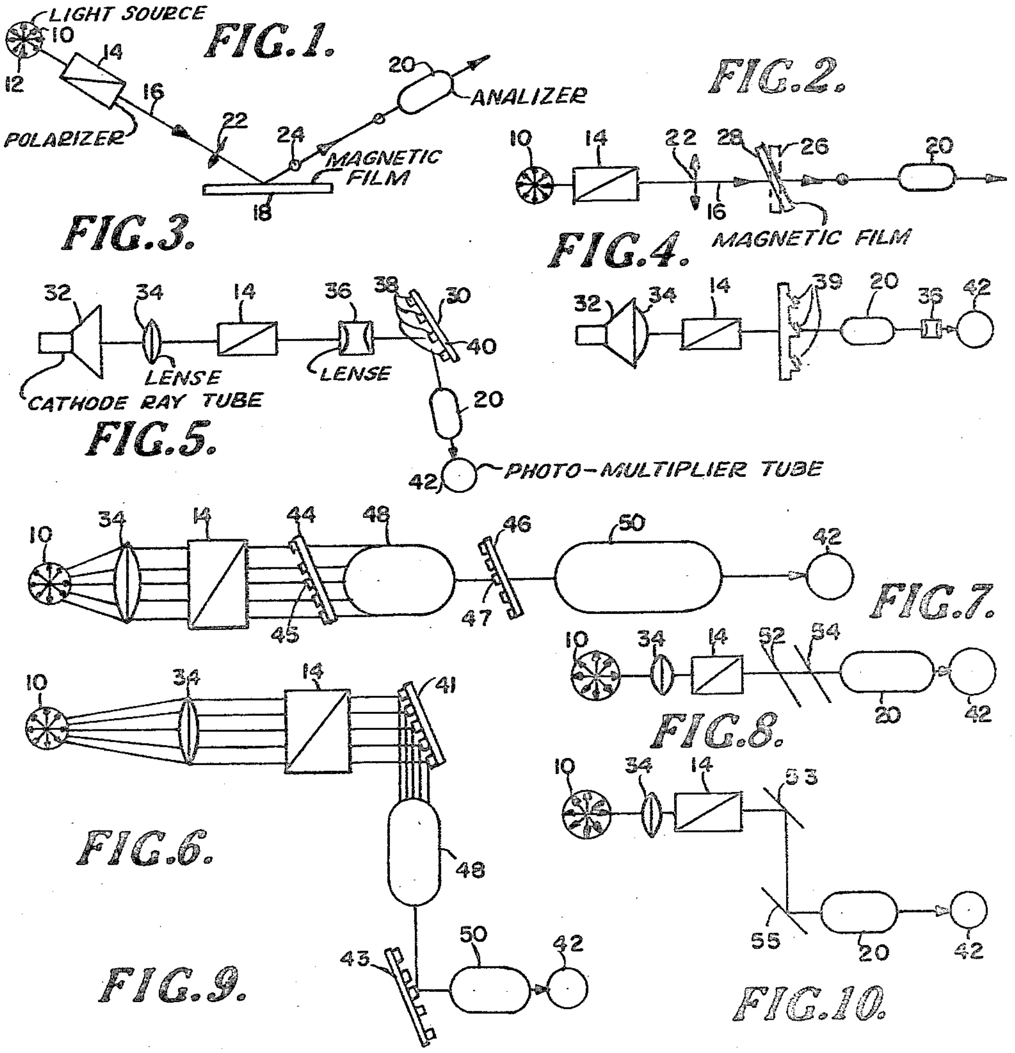
FIGURE 1 illustrates schematically the optical devices used to sense the remanent state of a film element using reflected polarized light.
FIGURE 2 illustrates in a similar manner an alternative embodiment of this invention using transmitted polarized light.
FIGURE 3 shows one embodiment of apparatus for non-destructively sensing the remanent state of a magnetic film element located on a memory matrix using reflected polarized light.
FIGURE 4 shows an alternative embodiment for non-destructive readout of a magnetic film element located in a memory matrix, utilizing transmitted polarized light.
FIGURE 5 illustrates an embodiment of non-destructive readout utilizing a film selection matrix and transmitted polarized light.
FIGURE 6 illustrates an alternative embodiment of non-destructive readout utilizing a film selection matrix and reflected polarized light.
FIGURE 7 illustrates an embodiment utilizing transmitted polarized light to perform a logical "AND" function.
FIGURE 8 illustrates an embodiment using reflected polarized light to perform a logical "AND" function.
FIGURE 9 illustrates an embodiment using transmitted polarized light to perform a logical "OR" function.
FIGURE 10 illustrates an embodiment using reflected polarized light to perform a logical "OR" function.

Referring to FIGURE 1, there is shown a source 10 of unpolarized light made up of components indicated by arrows 12 vibrating with periodical motion in random directions. This beam is directed through a polarizer 14, such as a Nicol prism or other readily available polarizers, which removes substantially all the components of the incident beam except those lying in a single plane determined by the polarization plane of the polarizer. The light waves 16 after having their vibrations confined to substantially one plane by the polarizer 14, are incident on a thin magnetic film 18. This film is of the type which can be produced according to the above mentioned Rubens patent, but is not limited to this method of production. The film has a preferred axis of magnetization, at least two stable states of magnetization, and is existing in one of these states. The incident plane-polarized light waves are reflected from film 18, and received by a suitable analyzer 20, which may also be a Nicol prism or other light polarizing material. It is found that the plane of polarization of the incident light waves, after reflection from, film 18, has been rotated a detectable amount.

To illustrate this phenomenon pictorially, a small vector 22 in FIGURE 1 is used to show that the light component remaining, after the light waves from source 10 are passed through the polarizing element, is vibrating in the plane of the drawing. After this beam is reflected from the magnetic film, however, the plane of polarization is rotated as indicated by dot 24, which represents an end view of vector 22. It should be understood, however, that the reflected light is not necessarily rotated 90°, i.e., the reflected light may not be circularly polarized, but only elliptically polarized. When the remanent magnetization of the magnetic film is switched from one remanent state to its opposite state the direction of rotation of the plane of polarization will be changed accordingly from its reference position, the reference position being the plane of incidence.

As employed in non-destructively sensing the information content of a thin film memory element, the analyzer 20 is rotated for near extinction of the reflected light when the film is magnetized in one stable state indicative of a binary "0", for example. With the analyzer held fixed in this position, when the remanent state of the film is switched by applying a suitable field, the plane of polarization of the reflected light will be rotated to a predetermined angular distance in a predetermined direction, thereby resulting in a substantial increase in the light intensity. The light intensity increase in this example is indicative of a binary "1". It should be understood, however, that the definition of low light intensity, being indicative of a binary "0" and high light intensity being indicative of a binary "1," is completely arbitrary. By locating a photo-multiplier cell or other light sensitive indicator in the beam of light passing through analyzer 20, it is possible to detect the state of magnetization by the relative intensity of the light incident thereon.

To insure optimum performance, the plane-polarized light incident to the thin magnetic film should have its electrical vector parallel or perpendicular to the plane of incidence to avoid the ordinary effect of elliptical polarization obtained by reflection of plane-polarized light from metallic surfaces at angles other than zero. Further, the thin magnetic film 18 should be oriented such that the preferred or easy direction of magnetization is parallel to the plane of incidence of the light.

FIGURE 2 illustrates schematically the manner in which the Faraday effect may be used to sense the remanent state of a very thin film memory element. In FIGURE 2, non-polarized light from source 10 is passed through polarizing means 14, thereby producing a plane-polarized light wave 16 vibrating in one plane in the direction indicated by vector 22. With the magnetic film positioned normally to the incident beam of plane-polarized light, as indicated by dashed line 26, reversal of the magnetic state of the film causes no measurable rotation of the polarization plane of the transmitted beam as observed with analyzer 20. However, when the magnetic film is inclined at an angle other than 90°, with respect to the incident beam as illustrated by solid line 28, the plane of polarization of the incident light waves is rotated by an observable amount, as the state of magnetization of the thin film is switched. The amount of rotation of the plane of polarization is related to the inclination of the film with respect to the normal incident beam.

By proper setting of the polarization-type analyzer 20 for near extinction of the transmitted light, when the film is in a given state of remanent polarization, the switching of this remanent state will result in a rotation of the plane of polarization to a predetermined angular distance in a predetermined direction, thereby causing an increase of the light intensity passing through the analyzer. The relative presence or absence of light waves from the analyzer can then be used to produce binary electrical signals if a photo-multiplier cell or any other photo-electrical detector is used as the sensing element.

FIGURE 3 shows apparatus capable of reading the information content of a memory matrix 30 without having to switch or disturb the magnetization of the film. This switching or disturbing operation was heretofore necessary in order to induce a voltage in a sense winding. The output from an address register (not shown) is used to deflect the electron beam of a cathode ray tube 32 to a desired coordinate location. The electrons, upon striking the phosphorescent screen of the tube produce essentially a point source of intense light which is then directed onto a light collimating lense 34. The collimator renders the light rays parallel, thereby producing a concentrated beam of unpolarized light. This beam of light is next passed through a suitable light polarizer 14 again producing a beam of plane-polarized light. The polarized light is then focused by means of lens 36 onto a predetermined single element of a plurality of film elements 38 deposited on a suitable substrate 40. The particular film is, of course, selected by the address register which causes a deflection of the electron beam to a predetermined coordinate location as mentioned above.

Matrix 30 is positioned such that the magnetization vector of the individual film elements will be in the plane of the film, but at some angle other than 90° to the plane of incidence of the incoming light. The plane of polarization of the incident light is therefore rotated upon striking the film (Kerr effect), so that the reflected light either passes through the fixed analyzer 20 or is substantially extinguished by it depending upon the remanent state of the film element and the position in which the fixed analyzer was set. Photo-multiplier 42 can then be used to produce an electrical output which is indicative of the remanent state of the film element. With the equipment used, an intensity ratio of at least 10 to 1 is obtainable at the photo-multiplier tube corresponding to the two stable magnetic states of the film.

The same function, as described above, with reference to FIGURE 3 is accomplished by using the apparatus of FIGURE 4. In this embodiment, plane-polarized light is transmitted through film elements 39 instead of being reflected from film elements 38. The plane of polarization of the incident light is rotated as described in connection with the apparatus of FIGURE 2 (Faraday effect).

An alternative method of constructing the embodiment of FIGURE 4 would be to coat or otherwise cover the face of cathode ray tube 32 with a sheet of polaroid light polarizing material, and deposit the thin film of magnetic materials thereon and thereby produce a more compact non-destructive sensing device.

Another means of providing non-destructive readout from a memory element is illustrated in FIGURE 5. In this embodiment, sets of films 44 and 46 are used. Set 44 may be termed a selection matrix, while set 46 may be called the memory matrix. Unpolarized light from source 10 is collimated by means of lens 34 and then plane-polarized by means of polarizer 14. In this embodiment, the light beam is sufficiently broad to fall on every magnetic film element contained on the selection matrix. Selection matrix 44 is identical to memory matrix 46 except that every film element on matrix 44 is normally set to the same state of remanent magnetization. Matrix 44 is optically aligned with matrix 46 such that a beam of light passed through a particular film element occupying a given coordinate location on the selection matrix, for example, element 45, will strike an element occupying an identical coordinate location on the memory matrix 46, for example, element 47. With the films on matrix 44 all magnetized in the same state of remanence and a beam of polarized light directed thereon, analyzer 48 is set for near extinction of the elliptically polarized transmitted light so that substantially no light falls on any of the magnetic films on matrix 46.

To select a particular film element on matrix 46 in order to readout the information content thereon, a corresponding film element on selection matrix 44, e.g., element 45, is switched to its opposite state of remanent magnetization. The switching of this film causes the plane of polarization of the beam of light passing through element 45 to rotate in a direction opposite to that produced when the film element is in its original or normal state. The light passing through the selected film is then able to pass through analyzer 48 and falls on corresponding film element on matrix 46, e.g., element 47. Analyzer 50 is originally set so that, if the memory film element on matrix 46 is in the opposite magnetic state from the selected film element or cell on matrix 44, the second analyzer 50 will extinguish the light. In this case there will be no output from the photo-multiplier tube 42. Conversely, if the memory cell is in the same state as the selected cell, the transmitted light will undergo two rotations in the same predetermined direction so that the light will be transmitted through the analyzer 50 to the photo-multiplier tube 42. It can be seen, therefore, that the magnetic elements on matrix 44 act as a shutter to permit or exclude light from falling on a particular film element on matrix 46. Because all the film elements on the selection matrix have been set to a predetermined state of magnetization, the relative presence or absence of light falling on the photo-multiplier tube is used to identify the binary information stored in the selection memory film element. For example, if all the magnetic films of matrix 44 are originally set to a state of positive remanence indicative of binary "1" and then a predetermined one of these elements is switched to a negative state of remanent magnetization (binary "0," if there is an output signal from the photo-multiplier tube, the selected memory element must be in the same state as the selected film element on matrix 44, i.e., a state indicative of binary "0." After the selection of each film element on matrix 46, a corresponding film element on matrix 44 must be switched back to its normal state of magnetization.

FIGURE 6 shows a similar means for providing nondestructive readout. Here, however, the Kerr effect is embodied by utilizing light reflected from selection matrix 41 and memory matrix 43. The operation of the apparatus of FIGURE 6 is the same as that of FIGURE 5 with the exception that reflected light (Kerr effect) rather than transmitted light (Faraday effect) is used.

By orienting two or more thin magnetic films with respect to suitable polarizers, analyzers and indicating devices, it is possible to perform many of the logical functions carried on in an electronic computing machine. In FIGURES 7 and 8, two alternative means for performing a logical "AND" function are shown. Light from source 10 is collimated by lens 34 and plane-polarization by means of polarizer 14. The plane of the polarized light suffers a rotation on passing through film element 52 in FIGURE 7 and on being reflected from film element 53 in FIGURE 8. Elements 52 and 54 are of sufficient thinness to transmit the greater portion of the light incident thereon, and elements 53 and 55 are of sufficient thickness to reflect the greater portion of the incident light. If film 54 is in the same magnetic state as film 52 in FIGURE 7 and film 55 is in the same magnetic state as film 53 in FIGURE 8, the plane of polarization of light waves incident respectively on film 52 and 53 will suffer a further rotation in the same predetermined direction. These light waves will not be extinguished by analyzer 20 which has been previously set for extinction of light waves passing through polarizer 14 with both films removed from the optical path. However, if film 52 is in the opposite state of remanence as film 54, and film 53 is in the opposite state of remanence as film 55, the plane of polarization of light waves incident respectively to films 52 and 53 will still suffer two rotations, but in opposite directions, thereby producing a net rotation of zero degrees. Since the net rotation of the plane of polarization of the incident light waves is zero, analyzer 20 will completely extinguish this incident light in both FIGURES 7 and 8 thereby producing no output from photo-multiplier tube 42. Thus, in both FIGURES 7 and 8 there will be an output signal from the photo-multiplier tube 42 if, and only if, film elements 52 and 54 and film elements 53 and 55 are respectively in the same state of remanent magnetization.

An extension of the foregoing material, which is capable of performing a logical "OR" function, is shown in FIGURES 9 and 10. Referring to FIGURE 9, an output from photo-multiplier tube 80 is produced when either film 72 or film 74 or films 72 and 74 are magnetized in the same state of remanence. Unpolarized light waves emanating from light sources 60 and 62 are formed into light beams by respectively passing through collimators 64 and 66. These light beams have their vibrations confined to one plane respectively by passing through polarizers 68 and 70. The plane-polarized light beams are then incident to magnetic films 72 and 74 respectively and rotated thereby to a predetermined angular distance in a predetermined direction. In this case, analyzers 76 and 78 are both set to produce extinction of the polarized light waves transmitted through films 72 and 74 when these films are in the same predetermined state of remanence. A photo-multiplier 80 is positioned so as to receive any light passing through analyzers 76 and 78. When either film 72 or film 74 is switched or both films 72 and 74 are switched to the opposite magnetic state for which analyzers 76 and 78 were previously set, light will be transmitted through either analyzer 76 or 78 or from both analyzers 76 and 78. This light will be incident on photo-multiplier 80 and thereby produce an electrical signal output.

FIGURE 10 shows a similar arrangement using films 73 and 75 which are of sufficient thickness to reflect the greater portion of light incident thereto. In this case, the operation is the same as in FIGURE 9 with the exception that rotation is achieved by reflecting the light waves from polarizers 68 and 70 respectively from film elements 73 and 75. Thus, as in the case of FIGURE 9, when either film 73 or 75 is switched or both films 73 and 75 are switched to the opposite magnetic state for which analyzers 76 and 78 were set, light will pass through either analyzer 76 or analyzer 78 or both analyzers 76 and 78, be incident to photo-multiplier 80, and thereby produce an electrical signal output.

Figure 11:
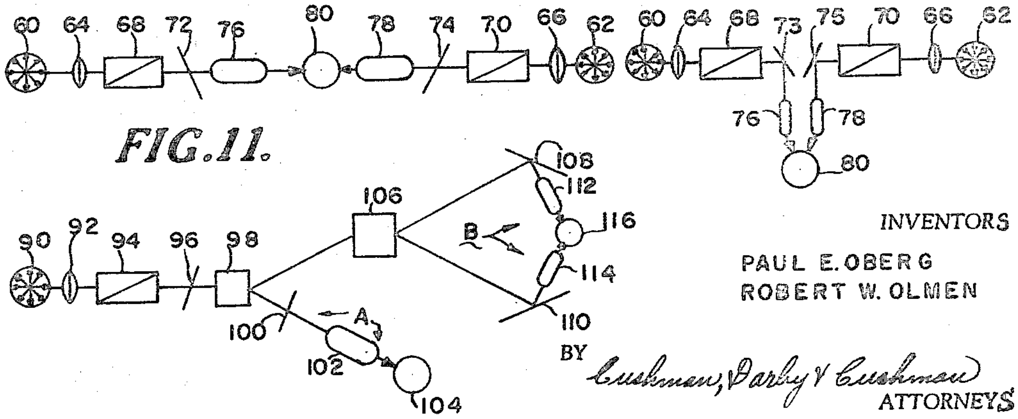
FIGURE 11 illustrates a network capable of performing various logical functions.

FIGURE 11 illustrates the manner in which the logical circuits of FIGURES 7, 8, 9 and 10 can be extended to form a complete network or logical chain. By properly orienting suitable beam splitting devices, e.g., 98 and 106 each in a single light path, it is possible to obtain a plurality of light paths, each of which may contain any of the given logical elements already described. A beam splitter may be realized by silvering one-half of a glass substrate so that the reflected beam from the silvered portion goes in one direction, while the remaining portion of the incident light is transmitted through the unsilvered transparent portion of the substrate.

A network capable of performing one logical "AND" and one logical "OR" function is shown in FIGURE 11. Unpolarized light emanating from light source 90 passes through collimator 92 and is plane-polarized by analyzer 94. The plane-polarized light is incident upon magnetic film 96, which is magnetized in a predetermined direction. The plane-polarized light is rotated to a predetermined angular distance in a predetermined direction by film 96. This rotated polarized light is divided into two beams by beam splitter 98. One beam enters each of the magneto-optical systems A and B located downstream from beam splitter 98. Magneto-optical system A consists of magnetic film 100 which exists in a predetermined magnetic state, analyzer 102 and photo-multiplier 104, all being in optical alignment. The combination of elements, light source 90, collimator 92, analyzer 94, film 96, beam splitter 98, film 100, analyzer 102 and photo-multiplier 104 forms the "AND" portion of the network. The operation of these elements is as has been previously explained in describing FIGURES 7 and 8.

The other beam enters system B, which includes beam splitter 106, magnetic films 108 and 110, analyzers 112 and 114, and photo cell 116. As is apparent, system B has a similar combination of elements as has the "OR" circuit shown in FIGURE 10. Beam splitter 106 divides the incident plan-polarized light waves into two beams having substantially the same polarization as the incident light waves and thereby in combination with the incident polarized light waves from beam splitter 98 replaces light sources 60 and 62, collimators 64 and 66, and 68 and 70 in FIGURE 10. The remainder of the magneto-optical system is identical to that of FIGURE 10. System B in combination with light source 90, collimator 92, polarizer 94, magnetic film 96, and beam splitter 98, therefore, forms the "OR" portion of the logical network. The function of elements 90, 92, 94, 96, and 98, when used in connection with performing a logical "OR" function, is to provide beam splitter 106 with an incident source of plane-polarized light. Magnetic films 108 and 110, analyzers 112 and 114, and photo-multiplier 116 correspond exactly to magnetic films 73 and 75, analyzers 76 and 78, and photomultiplier 80 respectively as shown in FIGURE 10. The operation of the "OR" portion of FIGURE 11 is the same as the aforedescribed operation of FIGURE 10.

FIGURE 11 shows for simplicity and clarity, a logical network capable of performing only one logical "AND" and "OR" function. However, by proper inclusion of additional magneto-optical systems similar to systems A and B, a logical network capable of performing any number of logical "AND" and "OR" functions may be formed. Also, it is clear that both the transmitted and reflected magnetic rotational principle (Kerr and Faraday effects) can be used.

Thus it is apparent that there is provided by this invention various embodiments in which the objects and advantages herein set forth are successfully achieved.

Modifications of this invention not described herein will become apparent to those of ordinary skill in the art after reading this disclosure. Therefore, it is intended that the matter contained in the foregoing description and accompanying drawings be interpreted as illustrative and not limitative, the scope of the invention being defined in the appended claims.

What is claimed is:

1. Apparatus for sensing the remanent magnetic state of a predetermined magnetic element selected from a first plurality of magnetic elements, each element having at least two stable states of magnetization along a certain axis of magnetization and existing in one or the other of said stable states comprising a source of light waves having vibrations confined substantially to one plane, means for dividing said light waves into parallel light beams, one for each magnetic element in said first plurality of magnetic elements, a second plurality of magnetic elements positioned in optical alignment with said first plurality of magnetic elements, each magnetic element having at least two stable states of magnetization, and all but one magnetic element existing in the same stable state, said one magnetic element being in optical alignment with said predetermined magnetic element, and existing in a different magnetic state from the other magnetic elements in said first plurality, said second plurality being positioned to receive said parallel beams of light waves at an angle other than normal thereto and at an angle other than 90° with said axis of magnetization, the light beams incident to the magnetic elements existing in the same magnetic state undergoing rotation to the extent of a predetermined angular distance in a first predetermined direction due to said same magnetic state, the light beam incident to said one magnetic element undergoing rotation to the extent of a predetermined angular distance in a second predetermined direction due to said different state of magnetization, a first analyzing means for transmitting the light beam which has been rotated in said second predetermined direction and for blocking the light beams which have been rotated in said first direction, said transmitted light beam being incident on said predetermined magnetic element at an angle other than normal thereto and at an angle other than 90° with said axis of magnetization, said light beam further undergoing rotation by the existing state of magnetization of said predetermined magnetic element, and a second analyzing means for receiving said further rotated light waves for determining the extent of rotation thereof and thereby indicating the remanent state of said predetermined magnetic element.

2. Apparatus as in claim 1 wherein said first and second plurality of magnetic elements consists of a first and second plurality of thin ferro-magnetic film elements located respectively on a first and second substrate means.

3. Apparatus as in claim 2 wherein said first and second plurality of magnetic film elements are of sufficient thickness to reflect the greater portion of the plane polarized light waves incident thereto, the reflected portion from said first plurality of film elements being incident to said first analyzing means and the reflected portion from said second plurality of film elements being incident to said rotation determining means.

4. Apparatus as in claim 2 wherein said substrate means are transparent and said first and said second plurality of thin ferro-magnetic film elements are of sufficient thinness to transmit the greater portion of the plane polarized light waves incident thereto, the transmitted portion from said first plurality of film elements being incident to said first analyzing means, and the transmitted portion from said second plurality of film elements being incident to said second analyzing means.

5. Apparatus as in claim 1 wherein there is included means optically coupled to said second analyzing means for providing an electrical indication of said rotation direction and thereby providing an electrical indication of the remanent magnetic state of the predetermined magnetic element.

6. Apparatus as in claim 1 wherein said second analyzing means is of the polarizing type and is oriented to transmit light waves from said predetermined magnetic element which have undergone rotation to a predetermined angular distance in a predetermined direction, said orientation being effective to block substantially all light waves from said magnetic element which have undergone rotation in a direction different from said predetermined direction, the intensity of the light waves transmitted from said rotation direction determining means thereby providing indication of the remanent magnetic state of said magnetic element.

7. Apparatus for performing a logical AND function comprising a source of light waves having vibrations confined substantially to one plane, at least a first and a second magnetic element, said first and second elements being in optical alignment and positioned to receive said light waves at an angle other than normal thereto, each element having at least two stable states of magnetization along a certain preferred axis of magnetization and existing in one or the other state of magnetization, said preferred axis of magnetization being at an angle other than 90° with the incident plane of said light waves, said incident light waves undergoing rotation to a predetermined angular distance in a predetermined direction due to the existing state of each magnetic element, analyzing means receiving said rotated light waves for transmitting only light waves from said first and second magnetic elements which have undergone rotation to a predetermined angular distance in the same predetermined direction due to both elements existing in the same magnetic state and means optically coupled downstream from said transmitting means for converting said transmitted light waves into an electrical signal, the arrangement being such that an electrical signal is produced when the magnetic elements are in the same magnetic state while no electrical signal is produced when the magnetic elements are in different magnetic states.

8. Apparatus as in claim 7 wherein said analyzing determining means is of the polarizing type and is oriented to transmit light waves from said first and second magnetic elements which have undergone rotation to a predetermined angular distance in the same predetermined direction due to both elements existing in the same magnetic state, said orientation being effective to block substantially all light waves from said second magnetic element which have undergone rotation in one direction when incident on said first magnetic element and undergone rotation in another direction when incident on said second magnetic element.

9. Apparatus as in claim 7 wherein said first and second magnetic elements are thin ferro-magnetic film elements respectively located on a first and a second substrate means.

10. Apparatus as in claim 9 wherein said first and second ferro-magnetic film elements are of sufficient thickness to reflect the greater portion of the light waves incident thereto, the portion of light waves reflected from said first film element being incident to said second film element, and the portion of light waves reflected from said second film element being incident to said analyzing means.

11. Apparatus as in claim 9 wherein said substrate means are transparent and said first and second film elements are of sufficient thinness to transmit the greater portion of the light waves incident thereto, the portion of light waves transmitted through said first film element being incident to said second film element and the portion of light waves transmitted through said second film element being incident to said analyzing means.

12. Apparatus for performing a logical OR function comprising a first and a second source of light waves having vibrations confined to substantially one plane, a first and second magnetic element positioned to receive said first and second planar light waves respectively at an angle other than normal thereto, each magnetic element having at least two stable states of magnetization along a certain preferred axis of magnetization and existing in one or the other stable state, said preferred axis being at an angle other than 90° with the respective incident plane of said light waves, said incident light waves undergoing rotation to a predetermined angular distance in a predetermined direction due to the respective existing magnetic states of said magnetic elements, a first and second analyzing means respectively oriented to block substantially all the light waves incident thereto when rotated by said existing states, said analyzers being effective to transmit light waves which have been respectively rotated a predetermined angular distance in a direction different than that due to said respective existing magnetization states, and means receiving the light waves transmitted by said analyzers for producing an electrical signal in accordance therewith.

13. Apparatus for performing logical AND functions and OR functions comprising a source of light waves having vibrations confined substantially to one plane, a first magnetic element, said one plane being incident to said first magnetic element at an angle other than normal thereto, said first magnetic element having two stable states of magnetization along a certain preferred axis of magnetization and existing in one of said axis of magnetization, said two magnetic states being at an angle other than 90° with the plane of incidence of said incident light waves, said planar light waves undergoing rotation to a predetermined angular distance in a predetermined direction due to the existing magnetic state of said first magnetic element, a plurality of magneto-optical systems located downstream from said first magnetic element and optically coupled thereto, each system including a first analyzing means for transmitting light waves from said first magnetic element which have undergone rotation a predetermined distance in a predetermined direction, and means interposed between said magneto-optical systems and said first magnetic element for dividing the light waves from said first magnetic element into a plurality of planar light beams, one beam entering each system.

14. Apparatus as in claim 13 wherein one of said systems includes a second magnetic element positioned to receive one of said light beams at an angle other than normal thereto, said magnetic element having two stable states of magnetization and existing in one of said magnetization states, said two stable magnetization states being at an angle other than 90° to the incident plane of the incident light beam, said incident light beam undergoing further rotation to a predetermined angular distance in a predetermined direction due to the existing state of said second magnetic member, means receiving said rotated light beams for transmitting only those light beams which have undergone rotation to a predetermined angular distance in the same predetermined direction due to said first and second magnetic elements existing in the same magnetic state, and means located downstream from said transmitting means for converting the transmitted light waves into an electrical signal, the arrangement being such that an electrical signal is produced when said first and second magnetic elements are in the same magnetic state, and no electrical signal is produced when said first and second magnetic elements are in different magnetic states.

15. Apparatus as in claim 13 wherein one of said plurality of magneto-optical systems comprises means located optically downstream from said light wave dividing means, at least one light beam from said light wave dividing means being incident thereto and being further split into at least two light beams, a second and third magnetic element each positioned to receive one of said two light beams at an angle other than normal thereto, each magnetic element having at least two stable states of magnetization and existing in one or the other stable state, said two states being at an angle other than 90° with the incident plane of said light beam, each incident light beam undergoing rotation to a predetermined angular distance in a predetermined direction due to the respective existing magnetic states of said second and third magnetic elements, a second and third analyzing means respectively oriented to block substantially all the light waves incident thereto when rotated by said existing magnetic states, said analyzers being effective to transmit light waves which have been respectively rotated to a predetermined angular distance in a direction different than that due to said respective existing magnetization states, and means receiving the light waves transmitted by said analyzers for producing an electrical signal in accordance therewith.

References Cited in the file of this patent

UNITED STATES PATENTS

| | | |
|---|---|---|
| 2,936,380 | Anderson | May 10, 1960 |
| 2,984,825 | Fuller et al. | May 16, 1961 |

OTHER REFERENCES

"Magnetic Domains by the Longitudinal Kerr Effect," by Fowler & Fryer, "Physical Review," vol. 94, No. 1, April 1, 1954, pp. 52 to 56.

"Magnetic Domains in Thin Films by the Faraday Effect," by Fowler & Fryer, "Physical Review," vol. 104, No. 2, Oct. 15, 1956, pp. 552, 553.

"Magneto-Optic Hysteresigraph," by Donald M. Hart, Technical Disclosure Bulletin, vol. 1, No. 5, February IBM Technical Disclosure Bulletin, vol. 1, No. 5, February 1959, pp. 18–19.